(12) United States Patent
Prothero

(10) Patent No.: US 11,310,090 B2
(45) Date of Patent: Apr. 19, 2022

(54) SYSTEMS, TRANSMITTERS, AND METHODS EMPLOYING WAVEFORM BANDWIDTH COMPRESSION TO TRANSMIT INFORMATION

(71) Applicant: Astrapi Corporation, Dallas, TX (US)

(72) Inventor: Jerrold Prothero, Delray Beach, FL (US)

(73) Assignee: Astrapi Corporation, Dallas, TX (US)

( * ) Notice: Subject to any disclaimer, the term of this patent is extended or adjusted under 35 U.S.C. 154(b) by 0 days.

(21) Appl. No.: 17/227,365

(22) Filed: Apr. 11, 2021

(65) Prior Publication Data

US 2021/0234744 A1    Jul. 29, 2021

Related U.S. Application Data

(63) Continuation of application No. 16/303,909, filed as application No. PCT/US2017/033915 on May 23, 2017, now Pat. No. 10,979,271.

(Continued)

(51) Int. Cl.
*H04L 27/10* (2006.01)
*H04L 27/26* (2006.01)
*H04L 27/18* (2006.01)

(52) U.S. Cl.
CPC .......... *H04L 27/2639* (2013.01); *H04L 27/10* (2013.01); *H04L 27/18* (2013.01)

(58) Field of Classification Search
CPC ...... H04L 27/10; H04L 27/18; H04L 27/2639
See application file for complete search history.

(56) References Cited

U.S. PATENT DOCUMENTS 3,204,034 A     8/1965  Ballard
3,384,715 A     5/1968  Higuchi
(Continued)

FOREIGN PATENT DOCUMENTS

CN     1271477     10/2000
FR     2638305     4/1990
(Continued)

OTHER PUBLICATIONS

Kvecher et al. An Analog Modulation Using a Spiral Mapping 2006 IEEE 24th Convention of Electrical and electronics Engineers in Israel, pp. 194-198 (5 pgs.).

(Continued)

*Primary Examiner* — Rahel Guarino
(74) *Attorney, Agent, or Firm* — Law Office of Michael Antone; Michael Antone

(57) ABSTRACT

Systems, transmitters, and methods employing waveform bandwidth compression to transmit information are provided. Transmitters may include an encoder to generate a time-domain amplitude sequence from information in a constant amplitude sinusoidal modulation format; fit a polynomial to the time-domain amplitude sequence, the fitted polynomial spanning at least one transmission time interval; and convert the polynomial to a transmission signal, the transmission signal comprising a sum of sinusoids of differing frequencies, each sinusoid having a continuously time-varying amplitude. A carrier source providing a carrier that is modulated with the transmission signal and transmitted through the system to a receiver, which receives the signal in the constant amplitude sinusoidal modulation format. The sum of sinusoids of differing frequencies having a continuously time-varying amplitude may be generated using instantaneous spectral analysis, to reduce the spectral occupancy of the transmission signal.

20 Claims, 4 Drawing Sheets

Related U.S. Application Data

(60) Provisional application No. 62/340,104, filed on May 23, 2016.

(56) References Cited

U.S. PATENT DOCUMENTS

| | | | |
|---|---|---|---|
| 4,540,957 A * | 9/1985 | Hanna | H03C 1/50 |
| | | | 332/109 |
| 5,034,911 A | 7/1991 | Rachels | |
| 5,205,169 A | 4/1993 | Masura | |
| 5,349,272 A | 9/1994 | Phillips | |
| 5,920,238 A | 7/1999 | Cairns | |
| 6,209,114 B1 | 3/2001 | Wolf | |
| 7,146,324 B2 | 12/2006 | Brinker et al. | |
| 7,327,803 B2 | 2/2008 | Sorrells et al. | |
| 7,355,470 B2 | 4/2008 | Sorrells et al. | |
| 7,647,030 B2 | 1/2010 | Sorrells et al. | |
| 8,438,447 B2 | 5/2013 | Chen | |
| 8,472,534 B2 | 6/2013 | Prothero | |
| 8,861,327 B2 | 10/2014 | Prothero | |
| 9,906,395 B2 | 2/2018 | Prothero | |
| 10,069,664 B2 | 9/2018 | Prothero | |
| 10,686,635 B2 | 6/2020 | Prothero | |
| 2002/0122505 A1 | 9/2002 | Avidor et al. | |
| 2003/0026357 A1 | 2/2003 | Bartlett | |
| 2003/0067990 A1 | 4/2003 | Bryant | |
| 2003/0133495 A1 | 7/2003 | Lerner | |
| 2004/0174737 A1 | 9/2004 | Graffouliere | |
| 2004/0213343 A1 | 10/2004 | Komamura | |
| 2004/0230387 A1 | 11/2004 | Bechhoefer | |
| 2005/0021319 A1 | 1/2005 | Li et al. | |
| 2005/0071742 A1 | 3/2005 | Balinsky | |
| 2005/0149296 A1 | 7/2005 | Sieracki | |
| 2006/0039455 A1 | 2/2006 | Cairns | |
| 2006/0227701 A1 | 10/2006 | Johnson | |
| 2007/0195952 A1 | 8/2007 | Singanamala | |
| 2008/0095121 A1 | 4/2008 | Shattil | |
| 2008/0130714 A1 | 6/2008 | Wilborn | |
| 2008/0298454 A1 | 12/2008 | Lewis | |
| 2008/0304666 A1 | 12/2008 | Chester et al. | |
| 2011/0150048 A1 | 6/2011 | Prothero | |
| 2011/0222584 A1 | 9/2011 | Michaels | |
| 2012/0076098 A1 | 3/2012 | Han et al. | |
| 2012/0263031 A1 | 10/2012 | Prothero | |
| 2013/0305120 A1 | 11/2013 | Osamu et al. | |
| 2014/0198869 A1 | 7/2014 | Melzer et al. | |
| 2015/0156049 A1 | 6/2015 | Prothero | |
| 2016/0212005 A9 | 7/2016 | Jones et al. | |
| 2019/0013974 A1 | 1/2019 | Prothero | |

FOREIGN PATENT DOCUMENTS

| | | |
|---|---|---|
| JP | 08-079320 | 3/1996 |
| JP | 10-098497 | 4/1998 |
| WO | 1998049812 | 11/1998 |
| WO | 2004080022 | 9/2004 |
| WO | 2008072935 | 6/2008 |
| WO | 2010004586 | 1/2010 |
| WO | 2011084280 | 7/2011 |
| WO | 2012066383 | 5/2012 |
| WO | 2017040996 | 3/2017 |
| WO | 2018085771 | 5/2018 |

OTHER PUBLICATIONS

Prothero, "The Shannon Law for Non-Periodic Channels", Technical Report ASTRAPI Exponential ommunication, Mar. 2, 2012, 30 pgs—(XP055360929).

Piwnicki, "Modulation Methods Related to Sine-Wave Crossings", IEEE Transactions on Communications, COM-31, No. 4, Apr. 1983, pp. 503-508 (6 pgs.).

Prothero, "Euler's Formula for Fractional Powers of i", Apr. 15, 2007, 72 pgs.

Li et al, "Spiral QAM Modulated CO-OFDM System with Increased Tolerance toward Laser Phase Noise", International Conference on Computer Science and Service System (CSSS 2014), pp. 13-16.

Larsson, "On Performance Analysis of Retransmission Schemes with Fading Channels", Sep. 2018, KTH Royal Institute of Technology, Sweden.

Touch, "An Optical Turing Machine for Native Network Processing of Modulated Data" 2012, IEEE CCW 2012.

Larsson, "Golden Angle Modulation: Approaching the AWGN Capacity", arXiv:1802.10022v1 [cs.IT] Feb. 27, 2018.

* cited by examiner

SYSTEMS, TRANSMITTERS, AND METHODS EMPLOYING WAVEFORM BANDWIDTH COMPRESSION TO TRANSMIT INFORMATION

CROSS-REFERENCE TO RELATED APPLICATIONS

This application is a continuation of U.S. patent application Ser. No. 16/303,909 filed on Nov. 21, 2018, which is the National Stage of International Application No. PCT/US2017/033915, filed May 23, 2017, which claims priority from U.S. Provisional patent Application No. 62/340,104, filed on May 23, 2016, entitled "Method for Waveform Bandwidth Compression," the entire contents of each are hereby incorporated by reference.

BACKGROUND

Applicant's prior U.S. Pat. No. 8,472,534 entitled "Telecommunication Signaling Using Non-Linear Functions" and U.S. Pat. No. 8,861,327 entitled "Methods and Systems for Communicating", the contents of which are herein incorporated by reference in their entirety, introduced spiral-based signal modulation. Spiral-based signal modulation may base signal modulation on complex spirals, rather than the traditional complex circles used by standard signal modulation techniques such as Quadrature Amplitude Modulation (QAM) and Phase-Shift Keying (PSK).

Several of Applicant's prior provisional and nonprovisional patent applications, U.S. Provisional Patent Application No. 62/213,418, entitled "Spiral Polynomial Division Multiplexing," U.S. patent application Ser. No. 15/255,944, entitled "Spiral Polynomial Division Multiplexing," and U.S. Provisional Patent Application No. 62/256,532, entitled "Method for Determining Instantaneous Spectral Usage", the contents of which are herein incorporated by reference in their entirety, introduced a novel method called "Instantaneous Spectral Analysis" (ISA). ISA is a method that may be used to decompose an arbitrary polynomial, which may represent a signal, into a sum of complex spirals, which may have a real-valued representation as a sum of sinusoids, each of which may have a continuously-varying amplitude. ISA introduced a method for identifying and grouping sinusoids with the same frequency together, such that the amplitude and power associated with each sinusoidal frequency at each instant in time in the spiral representation of a particular polynomial may be readily apparent.

Traditional techniques for determining spectral usage from a time domain sequence of amplitudes, including most notably the Fourier Transform (FT), typically do so by averaging spectral information over some period of time, resulting in a representation of the time domain using sinusoids with constant amplitude. However, ISA may allow the same time domain to be represented using a much smaller sinusoidal frequency range ("bandwidth") than is necessary using an FT. As digital communications may be considered to be based on the transmission of a time-domain sequence of amplitude values using bandwidth, and as bandwidth may be a very valuable resource, a method that may allow for more spectrally-efficient signal transmission may be desirable. Further, a method may be desirable for allowing higher spectral efficiency to be achieved while requiring as little change to existing radio architecture design as possible.

SUMMARY

Applicant's prior patent applications noted above disclosed the use of polynomials to describe signals, and the representation of these polynomials in terms of sums of complex spirals, using ISA. While the ISA technique may have general applicability, prior patents have focused particularly on the use of ISA within the context of a new signal modulation method introduced by the applicant called "Spiral Polynomial Division Multiplexing" (SPDM). However, ISA may also be used for bandwidth compression of information, or data, in conjunction with traditional signal modulation methods which may include Phase-Shift Keying (PSK), Frequency-Shift Keying (FSK), Quadrature Amplitude Modulation (QAM), Orthogonal Frequency Division Multiplexing (OFDM), and all or essentially all other traditional modulation formats.

According to an exemplary embodiment of a method for waveform bandwidth compression, the traditional modulation method may generate signal time domain amplitude sequences which can be represented by a polynomial, a condition which has general applicability. ISA may be applied to bandwidth compression of the transmissions of traditional modulation methods by the method of "Waveform Bandwidth Compression" (WBC) disclosed herein.

WBC may include a novel application of ISA, in which a time-domain amplitude sequence which may be generated by PSK or other traditional modulation methods is analyzed using ISA, which may occur before the Digital-to-Analog Conversion (DAC) step in the transmitter. Instead of transmitting the time-domain sequence for a particular Transmission Time Interval (TTI) using sinusoids with constant coefficients, WBC may allow the same time-domain sequence of amplitude values to be transmitted with much higher spectral efficiency using sinusoids with continuously-varying amplitude generated by ISA. The WBC approach may require no change in the amplitude sequences generated by traditional transmitters, and little or no modification to traditional receivers. WBC may therefore provide a method to significantly improve spectral efficiency of existing transmission systems while requiring minimal modification to traditional radio architecture design.

In particular, the method may include performing the following steps. First, an input sequence of real-valued amplitude signals may be received, or information may be processed to produce an input sequence of real-valued amplitude signals. Next, a polynomial may be fit to the input sequence, over the span of at least one transmission time interval. Next, the polynomial may be converted to a transmission signal, which may be formed from a sum of sinusoids with continuously time-varying amplitudes. The transmission signal may then be transmitted, and may be received as a time-amplitude sequence.

The step of converting the polynomial to a transmission signal may make use of instantaneous spectral analysis, which as mentioned may be discussed in more detail in the patent applications incorporated by reference. Specifically, instantaneous spectral analysis may entail projecting the polynomial onto Cairns series functions orthogonal in polynomial coefficient space; converting the polynomial from a function described by the Cairns series functions to a function described by Cairns exponential functions; and combining, into a sum of sinusoids (such as the transmission signal), frequency information contained within a function described by the Cairns exponential functions.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Figure 1A:
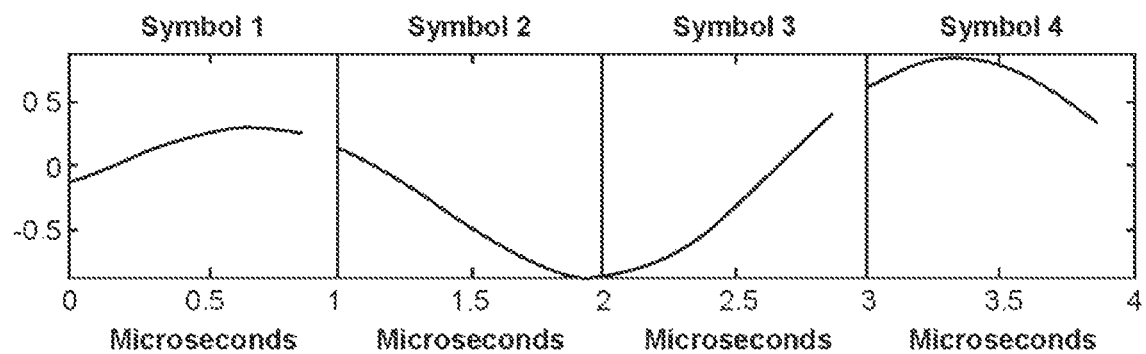
FIG. 1A may show an exemplary application of WBC to reducing the bandwidth requirements of Quadrature Phase Shift Keying (QPSK), and specifically may show a random sequence of four QPSK symbol waveforms at baseband.
Figure 1B:
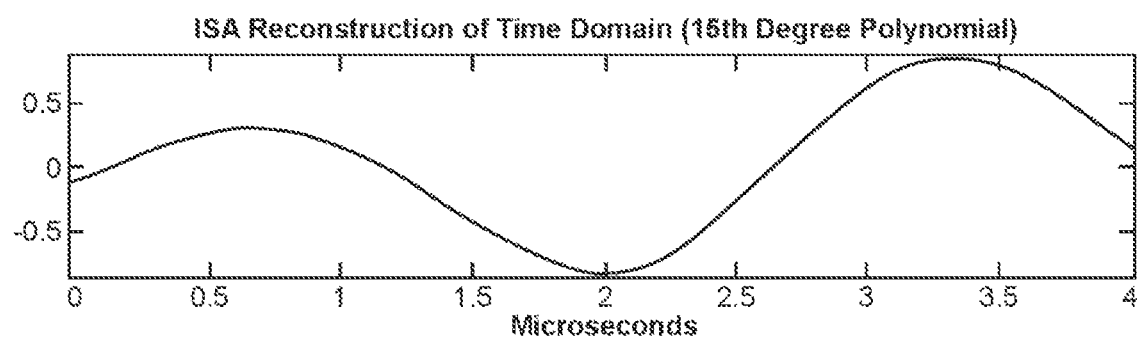
FIG. 1B may show an exemplary application of WBC to reducing the bandwidth requirements of Quadrature Phase Shift Keying (QPSK), and specifically may show a polynomial fit to a complete QPSK four symbol waveform sequence.
Figure 1C:
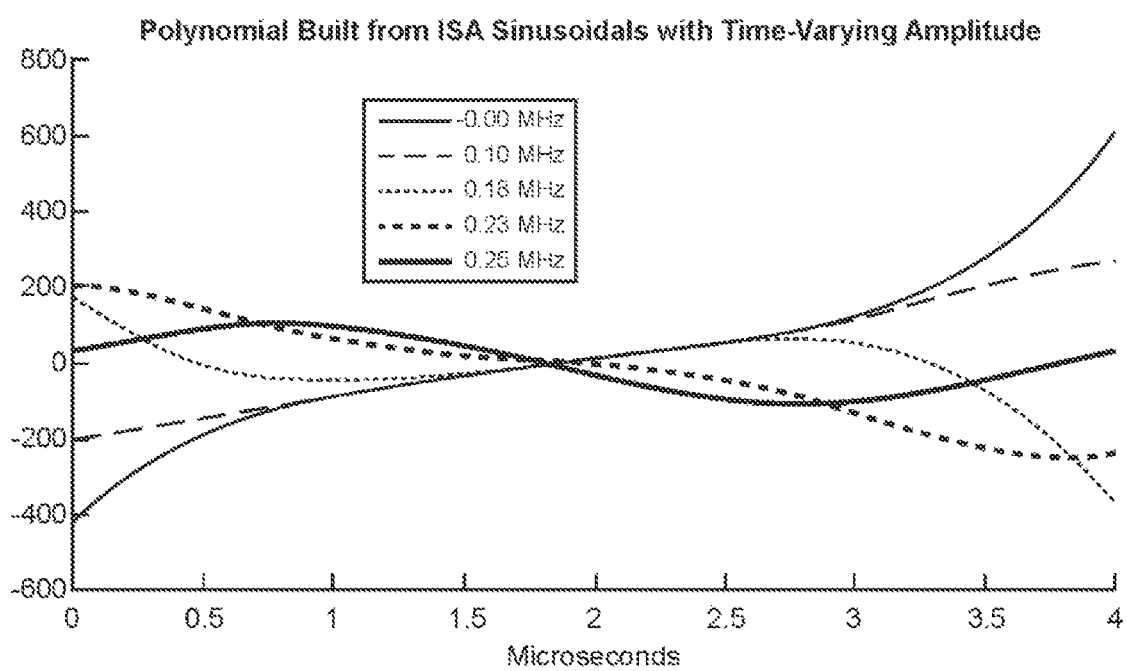
FIG. 1C may show an exemplary application of WBC to reducing the bandwidth requirements of Quadrature Phase Shift Keying (QPSK), and specifically may show a set of ISA-generated sinusoids with positive frequencies and which may have varying amplitudes.
Figure 1D:
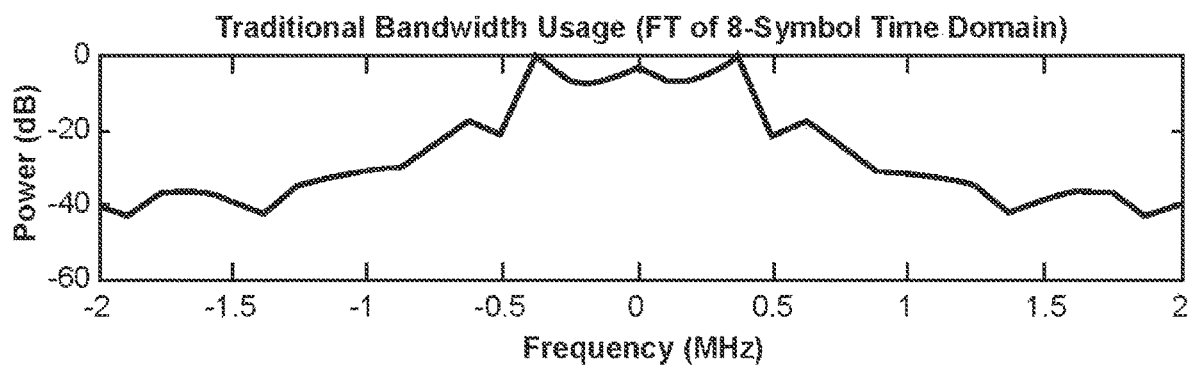
FIG. 1D may show an exemplary application of WBC to reducing the bandwidth requirements of Quadrature Phase Shift Keying (QPSK), and specifically may show the Fourier transform of a QPSK time domain which includes a sequence of symbol waveforms of the type shown in FIG. 1A.
Figure 1E:
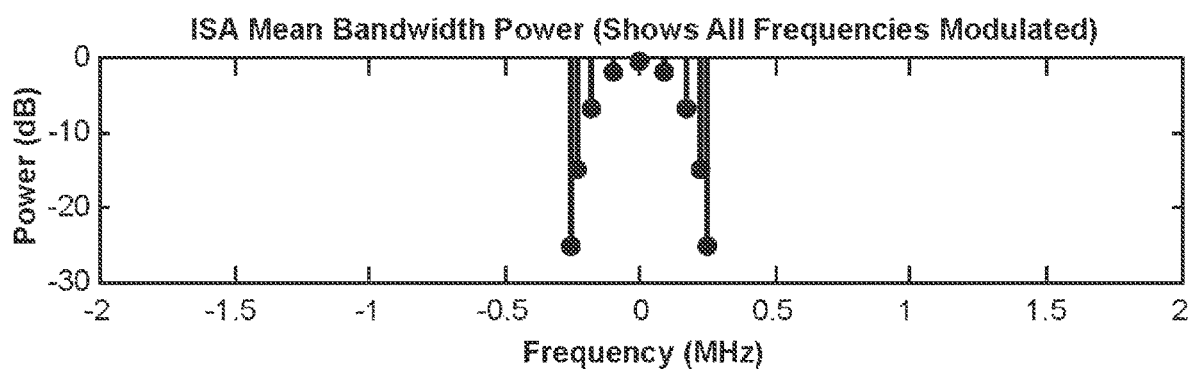
FIG. 1E may show an exemplary application of WBC to reducing the bandwidth requirements of Quadrature Phase Shift Keying (QPSK), and specifically may show a representation of the QPSK time domain shown in FIG. 1A.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by field programmable gate arrays, by program instructions being executed by one or more processors, or by a combination thereof. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, a method to modify signal transmission of traditional signal modulation methods may be contemplated. Such a method may be termed "Waveform Bandwidth Compression" (WBC) because it reduces the bandwidth requirements for transmitting a particular time-domain waveform when compared to traditional signal modulation.

According to an exemplary embodiment, WBC may take as input the sequence of time-domain amplitude values that might be generated in a transmitter employing traditional signal modulation methods, such as but not limited to PSK, FSK, QAM, or OFDM. WBC may be compatible with many different types of traditional signal modulation, and no further assumptions may be required concerning the nature of this signal modulation.

As an output, WBC may return a set of sinusoids of differing frequencies (the "frequency domain"), each of which has continuously time-varying amplitude. Summing the product of each sinusoid with its amplitude may allow the time domain amplitude sequence generated by PSK or other modulation techniques to be precisely reconstructed at each point in time.

According to some exemplary embodiments, WBC may include the following steps. First, a polynomial may be fit to the input sequence of real-valued amplitudes generated by a traditional transmitter. The input sequence may be a digital waveform having real-valued amplitudes representative of data or information to be transmitted or data and a clock. The polynomial may cover one or more Transmission Time Intervals (TTI's). Second, the polynomial may be converted into a sum of sinusoids with continuously time-varying amplitudes using the ISA method disclosed in applicant's prior patent applications. Third, the resulting ISA representation ("transmission signal") may be transmitted by the traditional transmitter. Fourth, the traditional receiver paired with the traditional transmitter may receive the transmission signal. Fifth, if the traditional receiver requires only the time-amplitude sequence intended by the traditional transmitter, it may be able to process the transmission signal as if it had been constructed using the traditional method of sinusoids with constant amplitude. Sixth, if the traditional receiver requires a representation of the signal in terms of sinusoids with constant amplitude as may be provided by traditional modulation, the receiver may be able to obtain this representation from an FT of the transmission signal. This may take advantage of the fact that the time-domain amplitude sequence may have identical representations in terms of ISA and a FT. So that while the amplitude sequence was transmitted using an ISA representation, it may be reconstructed by the traditional receiver as if it had been transmitted using a traditional representation.

Exemplary FIGS. 1A through 1E may show an exemplary application of WBC technology to reducing the bandwidth requirements of Quadrature Phase Shift Keying (QPSK) to approximately 25% of its spectral occupancy using standard signal transmission techniques. In other words, WBC may increase the spectral efficiency in this application by a factor of four. Exemplary FIG. 1A may show a random sequence of four QPSK symbol waveforms at baseband with a simulated 1 MHz of bandwidth and 1 Microsecond time duration for each QPSK symbol waveform. Exemplary FIG. 1B may show a polynomial fit to the complete QPSK four symbol waveform sequence, which may provide an equivalent representation of the QPSK four symbol time domain. Exemplary FIG. 1C may show a set of ISA-generated sinusoids with positive frequencies which may have continuously-varying amplitudes. The sum of these sinusoids, together with matched negative frequency sinusoids, may accurately reconstruct the time domain amplitude sequences in FIG. 1A and FIG. 1B. The waveforms in FIG. 1C may use no sinusoids with frequencies above 0.25 MHz. Exemplary FIG. 1D may show the FT of a QPSK time domain consisting of a sequence of symbol waveforms of the type shown in FIG. 1A. Specifically, FIG. 1D may show significant spectral occupancy out to at least 1 MHz. Exemplary FIG. 1E may show a representation of the QPSK time domain shown in FIG. 1A that may indicate no power in sinusoids with frequencies higher than 0.25 MHz. This may indicate that the bandwidth usage implied by an ISA representation of a QPSK symbol waveform sequence is much less than the bandwidth usage implied by an FT representation of a QPSK symbol waveform sequence.

Figure 2:
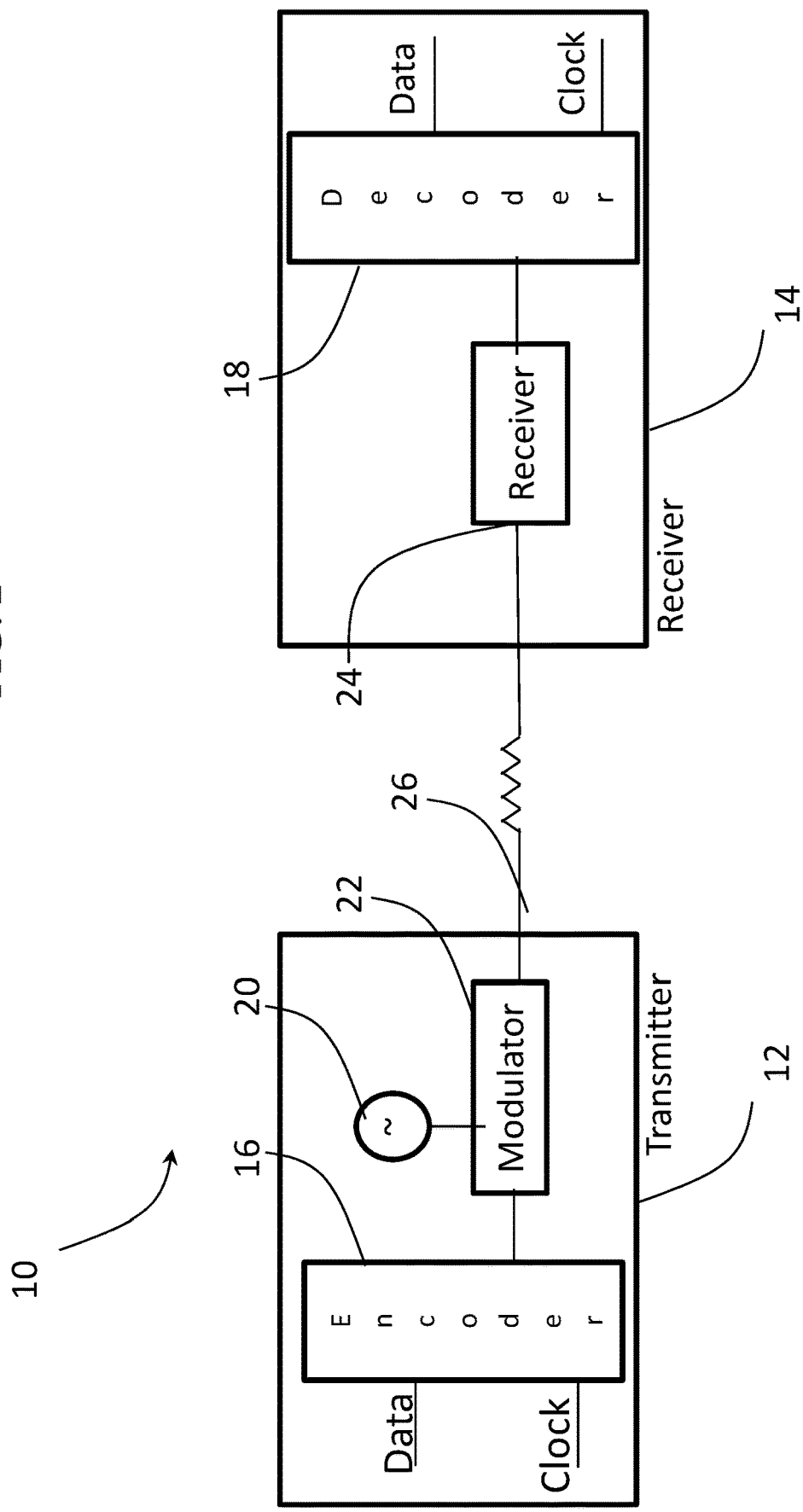
FIG. 2 may show an exemplary transmitter and receiver pair that may be configured to include WBC technology.
Figure 3:
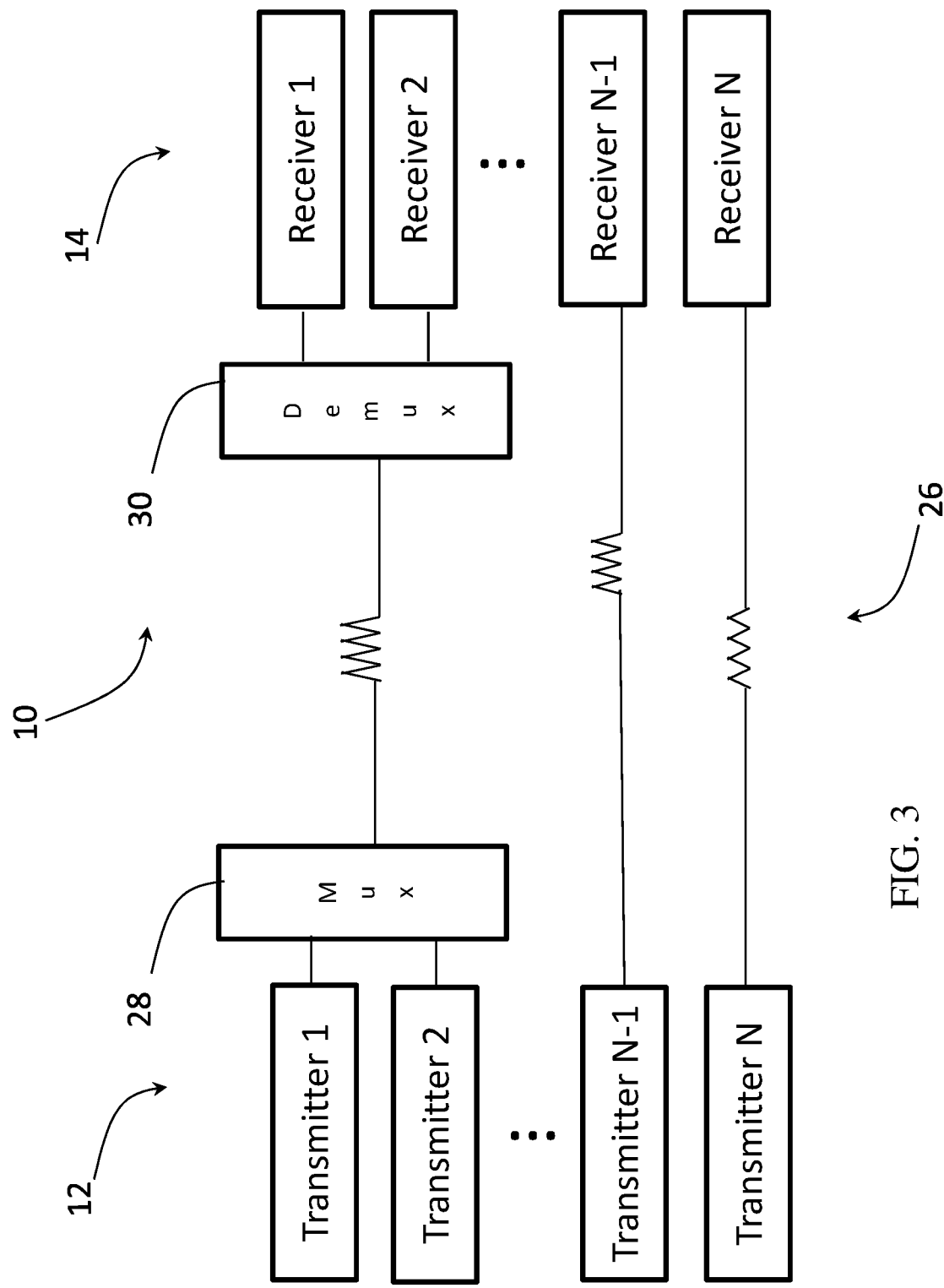
FIG. 3 may show an exemplary system or network including a plurality of transmitter and receiver pairs, some of which may be configured to include WBC technology.

FIG. 2 may show an exemplary transmitter and receiver pair used in a transmission or communication system, such as shown in FIG. 3. WBC technology may be implemented in the Encoder section of the transmitter, which may also include traditional signal modulation encoding of the information being transmitted. The encoded signal may then be used to modulate a carrier provided by a carrier source using an external modulation as shown in FIG. 2 or to directly modulate the carrier source to produce the transmission signal. While the Encoder and Decoder are shown as single blocks in FIG. 2, it will be appreciated that the Encoder and Decoder may include one or more stages/components that are used to process the information passing through the system, as desired by the skilled artisan.

At the receiver, a receiver may receive the transmission signal and provide the transmission signal to a decoder that may perform any decoding necessary to output the information, which may be in the form of data and clock signals.

FIG. 3 shows a plurality of transmitters and receivers that may be deployed in various wired and wireless transmission and communication systems that may include WBC technology. For example, these systems may include various electrical and optical wired transmission and communication networks, as well as satellite and terrestrial wireless networks. In various systems, the transmission signals may be multiplexed before transmission and may require demultiplexing after transmission, as is commonly performed in wired systems carrying multiple channels.

WBC technology of the present invention may be implemented in all of the transmitters and receivers in a system or network or only some portion of the transmitters and receivers in the system or network. In the manner, the WBC technology of the present invention may be rolled into new network builds, as well as retrofitted into existing networks to provide additional capacity in existing networks that include transmitters and receivers employing traditional signal modulation technology. Transmitters and receivers, according to exemplary embodiments of the present invention, may be deployed in existing networks to provide additional capacity in networks with unused channels. In addition, one or more transmitter and receiver pairs, according to exemplary embodiments of the present invention, may be used to replace a traditional transmitters and receivers already deployed in existing networks to provide additional capacity.

In a further exemplary embodiment, a method of transmitting information may be disclosed. Information may be processed to produce an input sequence of real-valued amplitude signals. A polynomial may be fitted to the input sequence covering at least one transmission time intervals. The polynomial may be converted to a transmission signal comprising a sum of sinusoids with continuously time-varying amplitudes. The transmission signal may be transmitted and the transmission signal may be received as a time-amplitude sequence. The received time-amplitude sequence may be further converted into at least one sinusoidal signal with constant amplitude. This may be done, for example, by adjusting the amplitudes of the received time-amplitude sequence to be a constant amplitude, in effect adjusting the time-amplitude sequence to be a transmission signal such as could have been constructed using the traditional method of sinusoids with constant amplitude.

In a further exemplary embodiment, a method of transmitting information may be disclosed. A polynomial may be fitted to an input sequence covering at least one transmission time intervals. The polynomial may be converted to a transmission signal comprising a sum of sinusoids with continuously time-varying amplitudes. The transmission signal may be transmitted and the transmission signal may be received as a time-amplitude sequence wherein receiving includes performing a Fourier Transform of the received transmission signal.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A transmitter comprising:
an encoder to
generate a time-domain amplitude sequence from information in a constant amplitude sinusoidal modulation format;
fit a polynomial to the time-domain amplitude sequence, the fitted polynomial spanning at least one transmission time interval;
convert the polynomial to a transmission signal, the transmission signal comprising a sum of sinusoids of differing frequencies, each sinusoid having a continuously time-varying amplitude; and
a carrier source providing a carrier that is modulated with the transmission signal.

2. The transmitter of claim 1, where the carrier source is directly modulated.

3. The transmitter of claim 1, where the carrier is a wireless carrier.

4. The transmitter of claim 1, where the transmitter is for use in one of a satellite and a terrestrial wireless network.

5. The transmitter of claim 1, where the constant amplitude sinusoidal modulation format is at least one of phase-shift keying (PSK) modulation, frequency-shift keying (FSK) modulation, quadrature amplitude modulation (QAM), or orthogonal frequency-division multiplexing (OFDM) modulation.

6. The transmitter of claim 1, where the encoder converts the polynomial to the transmission signal using instantaneous spectral analysis.

7. The transmitter of claim 6, where instantaneous spectral analysis comprises projecting the polynomial onto Cairns series functions;
converting the polynomial from a function described by the Cairns series functions to Cairns exponential functions; and
combining, into the transmission signal, the Cairns exponential functions into the sinusoids of differing frequencies.

8. The transmitter of claim 1, where the encoder encodes the information in the transmission signal in a plurality of stages.

9. The transmitter of claim 1, where the encoder fits the polynomial to the time-domain amplitude sequence over a plurality of transmission time intervals.

10. The transmitter of claim 1, where the encoder including at least one processor and computer readable storage medium.

11. A non-transitory computer readable medium storing instructions, the instructions comprising:
one or more instructions which, when executed by one or more processors, cause the one or more processors to:
generate a time-domain amplitude sequence of information using a constant amplitude sinusoidal modulation format;
fit a polynomial to the time-domain amplitude sequence, the fitted polynomial spanning at least one transmission time interval;
convert the polynomial to a transmission signal, the transmission signal comprising a sum of sinusoids of differing frequencies, each sinusoid having a continuously time-varying amplitude to be received in the constant amplitude sinusoidal modulation format; and
transmit, via a transmitter, the transmission signal.

12. The non-transitory computer readable medium of claim 11, where the constant amplitude sinusoidal modulation format is at least one of phase-shift keying (PSK) modulation, frequency-shift keying (FSK) modulation, quadrature amplitude modulation (QAM), or orthogonal frequency-division multiplexing (OFDM) modulation.

13. The non-transitory computer readable medium of claim 11, wherein the non-transitory computer readable medium and the at least one processor are included in the transmitter.

14. The non-transitory computer readable medium of claim 11, where the one or more instructions, that cause the one or more processors to convert the polynomial, cause the one or more processors to: convert the polynomial using instantaneous spectral analysis.

15. The non-transitory computer readable medium of claim 11, where the one or more instructions, that cause the one or more processors to convert the polynomial using instantaneous spectral analysis, cause the one or more processors to:
project the polynomial onto Cairns series functions;
convert the polynomial from a function described by the Cairns series functions to Cairns exponential functions; and
combine, into the transmission signal, frequency information contained in the Cairns exponential functions.

16. The non-transitory computer readable medium of claim 11, where the one or more instructions, when executed by the one or more processors, further cause the one or more processors to:
receive, at a receiver, the transmission signal as a time-domain amplitude sequence; and
convert the received time-domain amplitude sequence into the constant amplitude sinusoidal modulation format.

17. An information transmission system comprising:
a transmitter including
an encoder to
generate a time-domain amplitude sequence from information in a constant amplitude sinusoidal modulation format;
fit a polynomial to the time-domain amplitude sequence, the fitted polynomial spanning at least one transmission time interval;
convert the polynomial to a transmission signal, the transmission signal comprising a sum of sinusoids of differing frequencies, each sinusoid having a continuously time-varying amplitude; and
a carrier source providing a carrier that is modulated with the transmission signal; and
a receiver including
a decoder to
receive the transmission signal as a time- domain amplitude sequence, and
convert the received time-domain amplitude sequence into the constant amplitude sinusoidal modulation format.

18. The system of claim 17, where the transmitter is one of a plurality of transmitter, where at least one of the plurality of transmitters transmits information using the constant amplitude sinusoidal modulation format.

19. The system of claim 17, where the transmitter is a replacement for a traditional transmit that transmits information to a traditional receiver using the constant amplitude sinusoidal modulation format.

20. The system of claim 17, where a Fourier transformation is performed on the received time-domain amplitude sequence.

* * * * *